United States Patent

[11] 3,596,252

[72] Inventor David Anthony Dilwyn Duncan
Stevenage, England
[21] Appl. No. 783,017
[22] Filed Dec. 11, 1968
[45] Patented July 27, 1971
[73] Assignee British Aircraft Corporation Limited
London, England

[54] AUTOMATIC READ-OUT SYSTEMS
5 Claims, 2 Drawing Figs.

[52] U.S. Cl. .......... 340/172.5
[51] Int. Cl. .......... G06f 5/06, G06f 11/04
[50] Field of Search .......... 340/174.1, 173, 172.5; 235/157

[56] References Cited
UNITED STATES PATENTS

| | | | |
|---|---|---|---|
| 2,905,930 | 9/1959 | Golden | 340/172.5 |
| 3,012,230 | 12/1961 | Galas et al. | 340/172.5 |
| 3,020,525 | 2/1962 | Garrison et al. | 340/172.5 |
| 3,032,746 | 5/1962 | Kautz | 340/172.5 |
| 3,131,377 | 4/1964 | Grondin | 340/172.5 |

*Primary Examiner*—Gareth D. Shaw
*Attorney*—Kemon, Palmer and Estabrook

ABSTRACT: This is an automatic test equipment system which is tape controlled and in which the characters on the tape represent commands or signals which are sent to the equipment under test at predetermined intervals to initiate and control certain test sequences. The time interval between two commands may be critical to the test sequence and therefore the tape is read into a memory bank from which the characters can be read out at fixed time intervals which are independent of tape speed.

Figure 1:
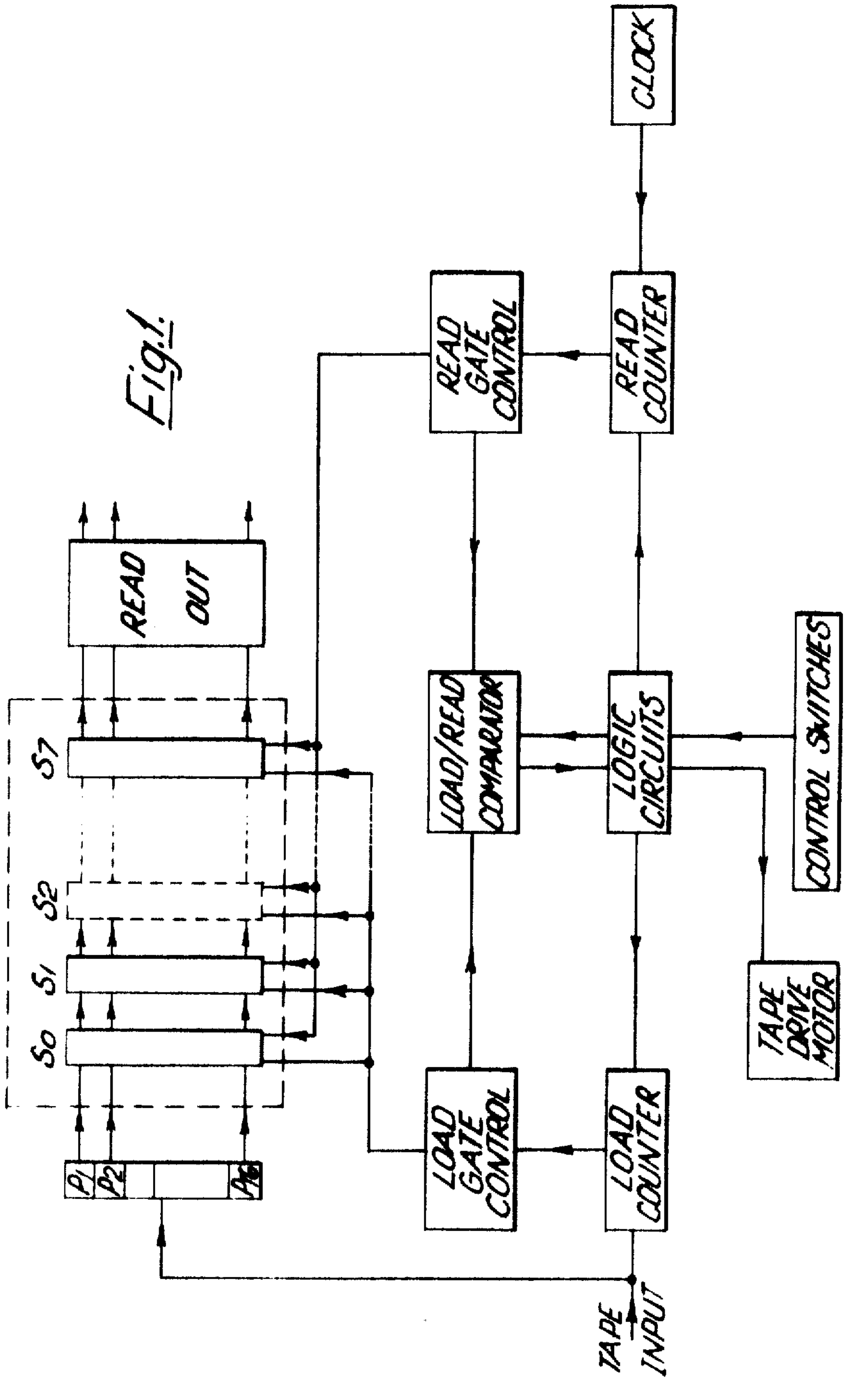

Inventor
David A. D. Duncan
By
Kemon Palmer & Estabrook
Attorneys

PATENTED JUL 27 1971 3,596,252

SHEET 2 OF 2

Inventor
David A. D. Duncan
By Kemon, Palmer & Estabrook
Attorneys

AUTOMATIC READ-OUT SYSTEMS

Automatic test equipment has recently been introduced for the testing of aircraft and other similar equipment employing complex circuitry. The test equipment is normally controlled from a tape and the first stage in such equipment is therefore a tape reader. The various tests are normally performed in a predetermined sequence at a rate which is determined by the speed of the tape. In some tests, however, it is critical that the time between tests should be precisely controlled and hence any tape jitter cannot be tolerated. One method of doing this is to use large memory stores which act as a reservoir of information, the data from the tape being fed in to the store before it is required, and the information subsequently being clocked out at precise intervals of time. Such stores, however, are fairly large and expensive.

According to the present invention a tape reader includes a memory store having a plurality of inputs connected in parallel, the inputs being selectively connected to sensing heads for reading sets of data successively presented to the heads, and a plurality of storage banks, a distributor for loading the storage banks in cyclic succession, means responsive to the existence of at least a predetermined number of loaded storage banks to permit the unloading means to withdraw a set of data from the next bank to be unloaded and means responsive to the existence of less than the said predetermined number of loaded storage banks to permit the distributor to load a further set or sets of data into the memory store whereby the loading of a set of data into the store is responsive to the unloading of a set of data previously loaded into the store and the loading and unloading occur substantially in synchronism but out of step with one another.

In this way any minor variations or jitter in the rate of loading, due for example to tape slippage, will not affect the rate of unloading provided that the shortest time interval between two withdrawals is not greater than the normal lag between unloading and loading. The tape jitter will normally cover a few sets of data and the memory store includes sufficient storage banks to accommodate this. The unloading is then normally carried out several sets of data behind the loading. Where the sets of data comprise instructions or programs for making measurements or setting up stimuli in a particular process, these will be carried out in real time. For example, in automatic test equipment, a clock generator controls the unloading of the store (and thereby the stepping forward of the tape) and the various commands, measurements, or stimuli represented by the different lines of information on the tape will appear at precise intervals of time after the commencement of a test. Under control of the clock generator, therefore, not only the order but the actual time at which a particular command will be carried out is fixed by the position of the line of information along the tape. For certain tests this is an extremely important advantage. A load/read comparator compares the number of storage banks which have been loaded with the number of storage banks which have been unloaded to ascertain the number of loaded banks at any particular instant of time.

Figure 2:
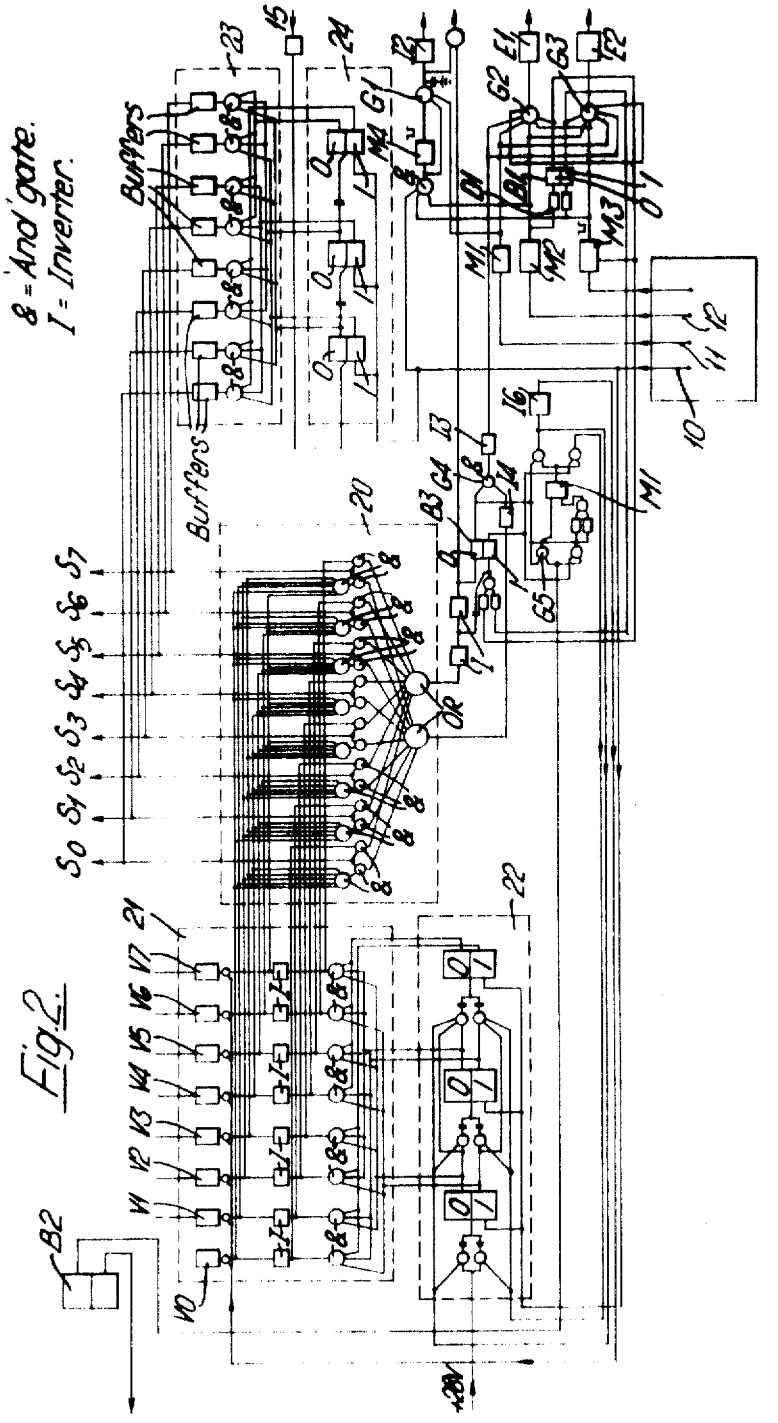

One example of the invention is shown in the accompanying drawings, in which:

FIG. 1 is a block diagram of a tape reader for use with automatic test equipment; and FIG. 2 is a more detailed circuit diagram of the blocks shown in FIG. 1.

Referring to FIG. 1, a tape passes between a light source and 16 photocells $P_1$ to $P_{16}$ such that information contained on the tape in the form of punched holes is fed into a memory store $S_0$ to $S_7$ as the tape is stepped forward. The loading of each storage bank is controlled from the load gate control circuit which is in turn controlled from the load/read comparator and the load counter. The readout of information from the stores is controlled from the read gate control circuit in The operation of the circuits is essentially as follows. A "ready to read" signal from a small hole in the tape in each line of punched holes triggers a monostable circuit. The positive edge of the monostable pulse causes the load gate control circuit to open the gates of the first store such that the information on the tape is fed into the first store. The negative edge of the monostable pulse then adds one to the load counter. When the load count reaches 5 (i.e. stores 0—4 have been loaded) a 0—4 output from the load/read comparator cuts off the drive to the motor and at the same time enables clock pulses to enter the read counter. The first clock pulse changes the read count to 1 and the read gate control circuit then enables the signals in the first store to be read out. The 0—4 output from the load/read comparator changes and the tape is therefore again driven forward. The next "ready to read" signal causes store $S_6$ to be loaded and the load count changes to 6. The comparator 0—4 output changes again, and information is therefore read out from the stores at the clock pulse frequency. Each time a store is emptied, the tape is stepped forward and a new "ready to read" signal appears. Any spasmodic variations in the tape stepping speed do not have any effect on the rate at which the information is read out from the system provided that any delay is shorter than the normal lag before the next clock pulse is due. As can be seen, the loading of the stores is approximately five frames ahead of the unloading.

Referring to FIG. 2, when the equipment is switched on a "1" output from a bistable in control unit 5 appears on line 11. This signal is inverted by the inverter $I_1$ and therefore closes the gates $G_1$, $G_2$ and $G_3$ which only open when all their inputs are at "1." The gate $G_1$ and the inverter $I_2$ then inhibit clock pulses which are normally applied along line 15 to the read counter 24. The gates $G_2$ and $G_3$ control the direction of motor drive in conjunction with the emitter followers $E_1$ and $E_2$ and when both $G_2$ and $G_3$ are closed the motor is stationary.

Switching on the equipment also produces a signal along the line 10 which resets the bistables in both the read and load counters to the "0" state. At this point, therefore, the tape is stationary, the two counters are set to "0," and all the information in the eight stores $S_1$ to $S_8$ is random.

When a "forward" button is pressed on the equipment control panel, the signal on the line 10 changes to a "1," thus freeing the load and read counters to input pulses, and at the same time a signal appears on the line 12 which triggers a 1 second monostable M2. After 1 second the positive edge of the monostable pulse sets a bistable $B_1$ into the "forward" state and also triggers the 200 microsecond monostable $M_4$ to inhibit the clock pulses for a further 200 microseconds. As a result of pressing the "forward" button four of the five inputs to the gates $G_1$ and $G_2$ are now at "1" (28volts). These inputs are; the outputs of both the 1 second monostables $M_2$ and $M_3$ the output of the bistable $B_1$; the reset "0" on line 11 which is inverted to give a "1." Hence, to finally open the gate $G_2$ and drive the motor forwards, a "1" signal must be obtained on the fifth input which comes from another inverter $I_3$, and is derived from the load/read comparator 20. There are two outputs from this comparator corresponding to a 0 count and a 0—4 count. When both the read and load counters have the same count, the 0 count output from the comparator is a "1," When the load counter contains not more than 4 more than the read counter the 0—4 count output is "1." Hence, 1 second after switching on the ATE and pressing the "forward" button both the comparator outputs are at "1." The 0—4 count output controls the supply to the tape drive motor through an inverter $I_4$ and an AND gate $G_4$ and a further inverter $I_3$. Hence it can be seen that 1 second after pressing the "forward" button all inputs to the gates $G_2$ and $G_3$ are at "1" and the tape moves off in a forward direction.

The tape is split into a series of frames each frame including a line of punched holes and in each line is a hole having a diameter substantially smaller than that of the punched holes. When this small hole is lined up with its photocell, a "ready to cell output flips a bistable $B_2$ which is not reset until all the program holes have passed over the program photocells. The position of the small hole is such that if tape snatch back occurs, the tape would have to be snatched back a distance equal to the radius of a program hole minus the radius of a "ready to read" hole if the same command were to be repeated. Since in practice the amount of snatch does not reach this distance the "ready to read" hole eliminates this possible fault.

The photocell outputs $P_1$ —16 are commoned to all the corresponding bit inputs in the eight stores. The channel output amplifier inputs $X_1$—16 are connected to all the corresponding bit outputs of the eight stores. The positive edge of the "ready to read" signal from the bistable $B_2$ triggers a 250 microsecond monostable circuit $M_1$ via the AND gate $G_5$. (The gate $G_5$ is opened by the output of the bistable $B_3$, which in turn is switched by the comparator 0 count output). The positive pulse output from the monostable $M_1$ brings the output of a 28 volt power inverter $I_6$ to "0" for 250 microseconds. (Provided the gate $G_6$ is open). The load gate control circuit 21 includes a series of 28 volt power inverters $V_0$ to $V_7$ which are connected through OR gates to the line 17 from the 28 volt power inverter $I_6$. When the load gate control outputs are at "0" the stores $S_0$ to $S_7$ are prevented from being loaded. When a signal appears along the line 17, since the load count is at 0 the output from $V_0$ will change to a "1", and hence the input gates in store $S_0$ open. The memories in store $S_0$ then change to whatever program is over the photocells $P_1$ to $P_{16}$ at that instant.

The load counter in contrast to the read counter can add or subtract negative edges. Hence in the above case the negative edge of the 250 microsecond pulse from the monostable $M_1$ is fed to the input of the load counter and changes the count to "1." Due to natural delays in the counter the 28 volt power inverter has relaxed all the store gates before the count has changed to "1." The next line of tape information is thus fed into store $S_1$. When five lines of tape have been loaded into five of the stores (stores 0 to 4 inclusive) the load count is 5 and the 0—4 count output of the comparator goes to a "0." As shown previously this stops the motor drive. This takes approximately 40 microseconds and when the 200 microsecond monostable circuit relaxes, clock pulses are now fed into the read counter 24. The first clock pulse into the reader is counted by the read counter which changes to a count of 1. The system is subsequently triggered to read and simulate the information on the output of the channel buffer which is the information in store $S_1$ As the read counter has a count of 1, the difference between the read and load counters is reduced to 4 and hence the 0—4 count output from the comparator is returned to 28 volts which results in the drive being returned to the motor. The tape again moves off until the next line has been loaded into store 5 and the comparator 0—4 output goes back to zero.

If, due to the outcome of a test the ATE commands a tape reversal, however, the stores have loaded into them a number of program lines which the ATE should not read as they lie physically after the line which produced (indirectly) the reverse command. Hence, when a reverse command is produced the 1 second reverse monostable $M_3$ is triggered, and this inhibits the tape drive for 1 second. Also for 1 second the clock and fault signals are inhibited. The positive going edge of the 1 second pulse flips the bistable $B_1$ feeding the gates $G_2$ and $G_3$. The positive going output from the bistable switches the bistable $B_3$ to the state shown. The negative going output from bistable $B_1$ closes the AND gate on the positive input of $M_1$ and one of the AND gates on the output. This prevents any loading into the stores. The negative edge from the bistable $B_3$ triggers monostable $M_1$ on the negative trigger input. The resulting 250 microsecond pulse feeds the "subtract" input of the load counter, and hence reduces the count by one.

The positive going edge of the monostable $M_3$ pulse triggers monostable $M_4$ inhibiting clock and fault signals for a further 200 microseconds and the motor now starts driving in reverse.

By using the disappearance of the "ready to read" signal (i.e. the negative edge of the "ready to read" bistable output) to trigger monostable $M_1$, the count in the load counter keeps in step with the tape. The result is that after a line of tape produces a reverse command to the ATE the next command to the ATE is produced by the line immediately preceding the line which produced the reverse command.

The load counter 22 is a shift register and the outputs from the bistables are connected through AND gates in the load gate control 21 to two banks of inverters, the corresponding inverters in each bank being connected in series with each other. In the running condition, following an increase in the load count, five of the output inverters $V_0$ to $V_7$ will be switched on and thus one of the banks of AND gates in the comparator 20 will be open. As the next store is filled, therefore, the second input to one of the second row of AND gates in the comparator will receive a signal. With two connected AND gates open, the OR gate will open and the 0—4 output from the comparator changes. As soon as the read count empties a store, one of the AND gates in the comparator loses its signal and closes. The 0—4 output therefore changes back to its original value and the tape drive motor is permitted to feed in the next line of tape.

I claim:

1. A tape reader including a plurality of sensing heads for reading respective tracks of a tape having bit characters recorded thereon, a tape drive for advancing the tape past the sensing heads, a memory store having a plurality of storage banks, first gating means operative to permit loading of the storage banks in cyclic succession with successively sensed characters, second gating means operative to permit unloading of the banks in cyclic succession, a comparator responsive to the loading and unloading of characters to and from the store respectively to assess the number of loaded storage banks at any instant, means responsive to a first output from the comparator indicating less than a predetermined number of loaded storage banks for inhibiting the second gating means to prevent unloading of the storage banks, means responsive to a second output from the comparator indicating at least the said predetermined number of loaded banks for inhibiting the tape drive while enabling the second gating means whereby the characters are serially readout with the loading and unloading occurring substantially in synchronism but out of step with one another and the tape is advanced to load a character only when less than the said predetermined number of storage banks are loaded.

2. A tape reader according to claim 1, including a load counter for counting the number of sets of data fed into the said memory store, a read counter for counting the number of sets of data withdrawn from the memory store and a comparator for comparing the load and read counts, the output from the comparator controlling the said unloading means such that the unloading means is permitted to withdraw a set of data from the memory store whenever the difference between the read count and the load count signifies the existence of at least the said predetermined number of loaded storage banks.

3. A tape reader according to claim 2, including a clock generator connected to the read counter such that the sets of data are withdrawn from the memory store at predetermined intervals of time.

4. A tape reader according to claim 1, including a control circuit for said first gating means responsive to the load count to open gates connected to each of the storage banks in cyclic succession.

5. Automatic test equipment including a tape reader according to claim 3, in which the said sets of data comprise program for performing predetermined test operations, the position of the sets of data along a tape being read determining under control of the said clock generator the order in which and the actual time at which the corresponding operations take place after the commencement of a test.